(12) United States Patent
Saje et al.

(10) Patent No.: US 11,299,205 B2
(45) Date of Patent: Apr. 12, 2022

(54) BODY STRUCTURES FOR AN AUTOMOTIVE VEHICLE UTILIZING UPPER AND LOWER SHEAR STRUCTURE ASSEMBLIES

(71) Applicant: GM GLOBAL TECHNOLOGY OPERATIONS LLC, Detroit, MI (US)

(72) Inventors: Robert N. Saje, Shelby Township, MI (US); Brian V. Castillo, Birmingham, MI (US); Giles D. Bryer, Northville, MI (US); Warren J. Parsons, Oakland, MI (US); Michael T. Chaney, Macomb, MI (US); Eric A. Mathieson, Rochester, MI (US); James A. Rochon, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 16/788,860

(22) Filed: Feb. 12, 2020

(65) Prior Publication Data
US 2021/0245809 A1    Aug. 12, 2021

(51) Int. Cl.
| | |
|---|---|
| *B62D 21/03* | (2006.01) |
| *B62D 25/02* | (2006.01) |
| *B62D 27/06* | (2006.01) |
| *B62D 21/17* | (2006.01) |
| *B62D 25/08* | (2006.01) |

(52) U.S. Cl.
CPC ............ *B62D 21/03* (2013.01); *B62D 21/17* (2013.01); *B62D 25/025* (2013.01); *B62D 25/08* (2013.01); *B62D 27/06* (2013.01)

(58) Field of Classification Search
CPC ........ B62D 21/03; B62D 21/17; B62D 25/08; B62D 27/06; B62D 25/025
USPC ..................................... 296/193.07
See application file for complete search history.

(56) References Cited

U.S. PATENT DOCUMENTS

| | | | | |
|---|---|---|---|---|
| 7,641,236 | B2 * | 1/2010 | Yasuhara | B62D 21/152 280/781 |
| 2018/0345778 | A1 * | 12/2018 | Yamanaka | B62D 21/02 |

\* cited by examiner

*Primary Examiner* — D Glenn Dayoan
*Assistant Examiner* — Dana D Ivey
(74) *Attorney, Agent, or Firm* — Quinn IP Law (57) ABSTRACT

A body structure for an automotive vehicle includes an enclosure for a power source, an upper shear structure assembly and a lower shear structure assembly. The enclosure includes a front cross-member, a rear cross-member, a left rocker and a right rocker. The upper and lower shear structure assemblies are disposed across the top and bottom of the enclosure, respectively, and are fastened to respective top and bottom surfaces of the cross-members and rockers. The upper and lower shear structure assemblies may include respective front and rear generally trapezoidal sections configured for attachment to respective front and rear box structures. Each of the shear structure assemblies is effective to dissipate in-plane a portion of an external load imposed upon the enclosure.

19 Claims, 9 Drawing Sheets

BODY STRUCTURES FOR AN AUTOMOTIVE VEHICLE UTILIZING UPPER AND LOWER SHEAR STRUCTURE ASSEMBLIES

INTRODUCTION

This disclosure relates generally to body structures for automotive vehicles, and more particularly to body structures for automotive vehicles utilizing upper and lower shear structure assemblies for under-floor energy systems.

Rechargeable energy storage systems (RESS) are used on-board some automotive vehicles as a power source for propulsion. Examples of RESS include batteries and capacitors (for electric vehicles), hydrogen tanks (for fuel cell vehicles), and other types of rechargeable power sources. RESS systems can sometimes take up significant space in the vehicle. To address this challenge, RESS systems may be packaged in places such as the vehicle trunk, the center tunnel and under the passenger cabin floorboard. RESS systems packaged under the floorboard of a vehicle may be referred to as under-floor energy storage (UFES) systems.

It is desirable to make the UFES as large as possible in order to maximize the energy density/range provided, while also keeping the surrounding body structure as small as possible. However, packaging the RESS/UFES in this under-floor area may expose the power source to damage in the event of external objects making contact with the vehicle.

SUMMARY

According to one embodiment, a body structure for an automotive vehicle includes an enclosure for a power source, the enclosure including a front cross-member, a rear cross-member disposed generally parallel to and spaced apart the front cross-member, a left rocker connected at opposed first and second ends thereof to respective left ends of the front and rear cross-members, and a right rocker connected at opposed third and fourth ends thereof to respective right ends of the front and rear cross-members; an upper shear structure assembly disposed across a top of the enclosure and fastened to respective top surfaces of the front and rear cross-members and the left and right rockers; and a lower shear structure assembly disposed across a bottom of the enclosure and fastened to respective bottom surfaces of the front and rear cross-members and the left and right rockers. The upper shear structure assembly may include a front upper edge extending along the front cross-member, a rear upper edge extending along the rear cross-member, a generally trapezoidal front upper section extending from the front upper edge and a generally trapezoidal rear upper section extending from the rear upper edge, and the lower shear structure assembly may include a front lower edge extending along the front cross-member, a rear lower edge extending along the rear cross-member, a generally trapezoidal front lower section extending from the front lower edge and a generally trapezoidal rear lower section extending from the rear lower edge. The generally trapezoidal front upper and lower sections may be configured for attachment to a front box top portion and a front box bottom portion, respectively, of a front box structure, and the generally trapezoidal rear upper and lower sections may be configured for attachment to a rear box top portion and a rear box bottom portion, respectively, of a rear box structure. Alternatively, each of the generally trapezoidal front upper and lower sections may be configured for attachment to the front box bottom portion of the front box structure, and each of the generally trapezoidal rear upper and lower sections may be configured for attachment to the rear box bottom portion of the rear box structure. Each of the upper and lower shear structure assemblies may define a respective plane wherein each of the shear structure assemblies is effective to dissipate in-plane a portion of an external load imposed upon the enclosure.

At least one of the upper and lower shear structure assemblies may be constructed as at least one of a metallic foam sandwich and a lattice of interconnected structural members. The body structure may further include at least one intermediate cross-member, wherein each intermediate cross-member has a respective fifth end attached to the left rocker and a respective sixth end attached to the right rocker. The body structure may further include the power source, wherein each of the at least one intermediate cross-member extends through the power source. The enclosure may be configured for positioning between front and rear axles of the automotive vehicle. The enclosure may be generally rectangular or generally trapezoidal.

According to one embodiment, a body structure for an automotive vehicle, wherein the automotive vehicle defines front and rear longitudinal directions, left and right transverse directions, and upward and downward vertical directions, includes: (i) a quadrilateral-shaped main box structure for a power source, the main box structure including a transversely oriented front cross-member having a main box front width $W_{MF}$, a rear cross-member disposed generally parallel with and to the rear of the front cross-member and having a main box rear width $W_{MR}$, a left rocker connected at opposed first and second ends thereof to respective left ends of the front and rear cross-members, and a right rocker connected at opposed third and fourth ends thereof to respective right ends of the front and rear cross-members; (ii) a front box structure connected to the front cross-member and having a front box width $W_F$ less than the main box front width $W_{MF}$; (iii) a rear box structure connected to the rear cross-member and having a rear box width $W_R$ less than the main box rear width $W_{MR}$; (iv) an upper shear structure assembly having an upper main portion disposed across a top of the main box structure and fastened to respective top surfaces of the front and rear cross-members and the left and right rockers, a generally trapezoidal front upper section extending forward from a front upper edge of the upper main portion and attached to the front box structure, and a generally trapezoidal rear upper section extending rearward from a rear upper edge of the upper main portion and attached to the rear box structure; and (v) a lower shear structure assembly having a lower main portion disposed across a bottom of the main box structure and fastened to respective bottom surfaces of the front and rear cross-members and the left and right rockers, a generally trapezoidal front lower section extending forward from a front lower edge of the lower main portion and attached to the front box structure, and a generally trapezoidal rear lower section extending rearward from a rear lower edge of the lower main portion and attached to the rear box structure.

Each of the upper and lower shear structure assemblies may define a respective plane wherein each of the shear structure assemblies is effective to dissipate in-plane a portion of an external load imposed upon the main box structure, the front box structure and/or the rear box structure. At least one of the upper and lower shear structure assemblies may be constructed as at least one of a metallic foam sandwich and a lattice of interconnected structural members. The front box structure may include left and right upper longitudinal front rails, left and right lower longitudinal front rails, and a plurality of vertical and transverse front members interconnecting the longitudinal front rails, and the rear box structure may include left and right upper longitudinal rear rails, left and right lower longitudinal rear rails, and a plurality of vertical and transverse rear members interconnecting the longitudinal rear rails. The body structure may further include at least one intermediate cross-member, wherein each intermediate cross-member has a respective fifth end attached to the left rocker and a respective sixth end attached to the right rocker.

According to one embodiment, an automotive vehicle assembly includes: (i) a generally rectangular main box structure comprising a transversely oriented front cross-member having a main box front width $W_{MF}$, a rear cross-member disposed generally parallel with and to the rear of the front cross-member and having a main box rear width $W_{MR}$, a left rocker connected at opposed first and second ends thereof to respective left ends of the front and rear cross-members, and a right rocker connected at opposed third and fourth ends thereof to respective right ends of the front and rear cross-members; (ii) a front box structure connected to the front cross-member and having a front box width $W_F$ narrower than the main box front width $W_{MF}$; (iii) a rear box structure connected to the rear cross-member and having a rear box width $W_R$ narrower than the main box rear width $W_{MR}$; (iv) an upper shear structure assembly having an upper main portion disposed across a top of the main box structure and fastened to respective top surfaces of the front and rear cross-members and the left and right rockers, a generally trapezoidal front upper section extending forward from the upper main portion and attached to the front box structure, and a generally trapezoidal rear upper section extending rearward from the upper main portion and attached to the rear box structure; (v) a lower shear structure assembly having a lower main portion disposed across a bottom of the main box structure and fastened to respective bottom surfaces of the front and rear cross-members and the left and right rockers, a generally trapezoidal front lower section extending forward from the lower main portion and attached to the front box structure, and a generally trapezoidal rear lower section extending rearward from the lower main portion and attached to the rear box structure; and (vi) a power source disposed within the main box structure and between the upper and lower shear structure assemblies.

The lower shear structure assembly may be removably fastened to respective lower portions of the left and right rockers. Each of the upper and lower shear structure assemblies may define a respective plane wherein each of the shear structure assemblies is effective to dissipate in-plane a portion of an external load imposed upon the main box structure, the front box structure and/or the rear box structure. At least one of the upper and lower shear structure assemblies may be constructed as at least one of a metallic foam sandwich and a lattice of interconnected structural members. The automotive vehicle assembly may further include at least one intermediate cross-member, wherein each intermediate cross-member has a respective fifth end attached to the left rocker and a respective sixth end attached to the right rocker.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 2A:
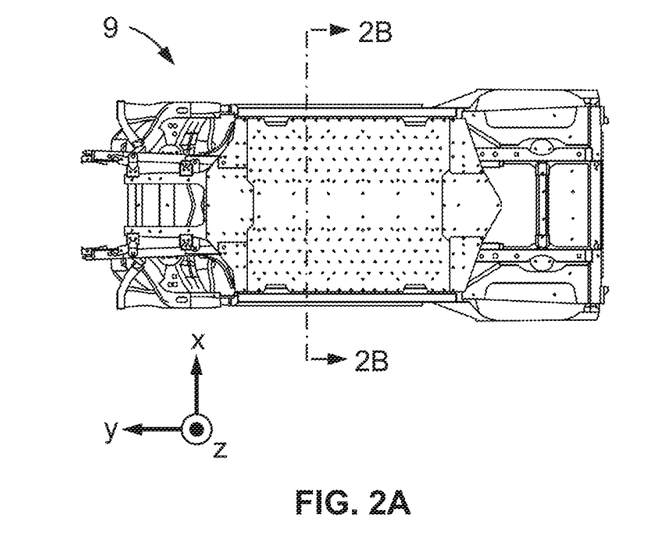
FIG. 2A is a top view of an automotive vehicle frame in accordance with the disclosure.
Figure 2B:
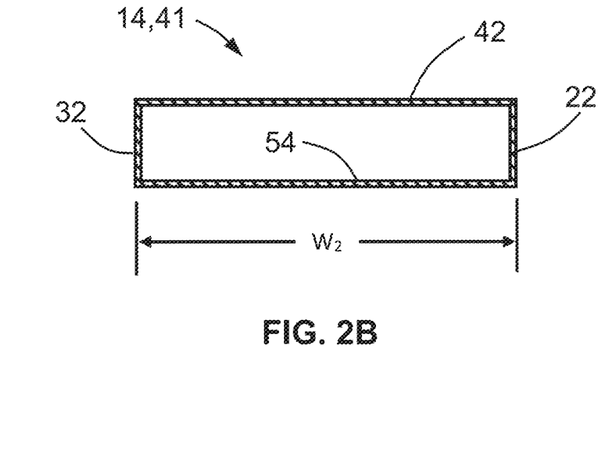
FIG. 2B is a schematic sectional view of the vehicle frame of FIG. 2A as viewed along line 2B-2B.

Note that some of the drawings herein are presented in multiple related views, with the related views sharing a common Arabic numeral portion of the figure number and each individual view having its own unique "alphabetic" portion of the figure number. For example, FIGS. 2A and 2B are top and schematic sectional views, respectively, of an automotive vehicle frame in accordance with the disclosure; both related views share the same Arabic numeral (i.e., 2), but each individual view has its own unique "alphabetic" designation (i.e., A or B). When drawings are numbered in this way, reference may be made herein to the Arabic number alone to refer collectively to all the associated "alphabetics"; thus, "FIG. 5" refers to FIGS. 5A through 5E collectively. Likewise, "FIG. 6" refers to FIGS. 6A through 6C collectively, and so on.

DETAILED DESCRIPTION

Referring now to the drawings, wherein like numerals indicate like parts in the several views, various embodiments of a body structure for an automotive vehicle and an automotive vehicle assembly are shown and described herein. These body structures and vehicle assemblies may be particularly well suited for use in vehicles having UFES systems. These include "alternative" vehicles, which are any vehicles whose propulsion is derived in whole or in part by an on-board power source other than a conventional internal combustion engine. For example, an alternative vehicle includes any vehicle having a storage battery or battery assembly which may be used as a power source for propulsion of the vehicle; this includes "fully electric" vehicles that have no internal combustion engine and rely only on electricity from a storage battery to power electric motors for propelling the vehicle, as well as "partially electric" or "hybrid" vehicles which utilize both mechanical energy from an internal combustion engine and electrical energy from a storage battery to propel the vehicle. However, the body structures and vehicle assemblies of the present disclosure may also be used for conventional vehicles which utilize an internal combustion engine for propulsion. Thus, the UFES system may be used to store a battery assembly for an electric vehicle, gasoline or diesel fuel for a conventional (internal combustion engine) vehicle, hydrogen for a fuel cell vehicle, and so forth. As used herein, a "power source" may include a battery or battery assembly, as well as other energy sources such as gasoline, diesel fuel, propane, liquified petroleum gas (LPG), hydrogen gas, etc. stored in one or more appropriate containers.

Figure 1A:
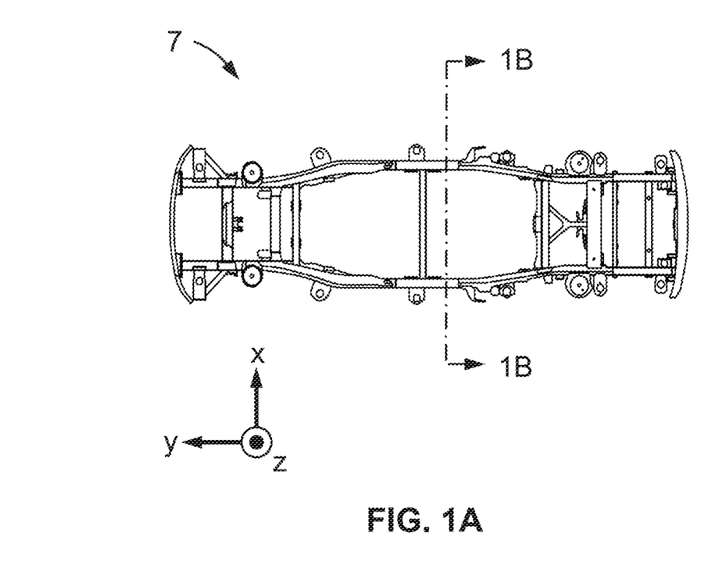
FIG. 1A is a top view of a conventional vehicle frame.

FIG. 1A shows a top view of a vehicle frame or chassis 7 for a conventional vehicle powered by an internal combustion engine. (The frame 7 shown here is known as a "body on frame" (BOF) type, but the discussion herein also applies to other frame/chassis types, such as "body frame integral" (BFI) and the like.) As illustrated by the x-y-z coordinate axes shown in FIG. 1A (and as otherwise used herein), the positive y-direction points from the rear of the vehicle toward the front of the vehicle, thereby defining a "longitudinal" axis and orientation along the length of the vehicle (with frontward and rearward longitudinal directions corresponding to the positive and negative y-directions, respectively). The positive x-direction points from the left of the vehicle toward the right of the vehicle, thereby defining a "transverse" axis and orientation across the vehicle orthogonal to the longitudinal or y-direction axis (with leftward and rightward transverse directions corresponding to the negative and positive x-directions, respectively). These longitudinal and transverse axes (and the corresponding positive and negative x- and y-directions) mutually define a horizontal plane which is generally parallel with level ground. A positive z-direction points upward from the vehicle and a negative z-direction points downward from the vehicle, thereby defining a "vertical" axis and orientation that is orthogonal to both the longitudinal or y-axis and the transverse or x-direction axis (with the vertical axis also being orthogonal to the horizontal plane).

Figure 1B:
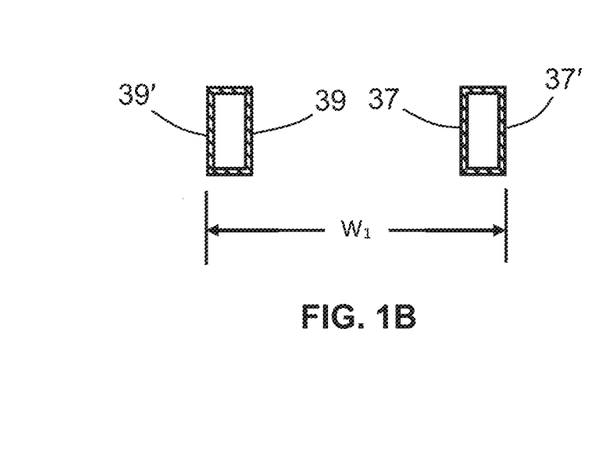
FIG. 1B is a schematic sectional view of the vehicle frame of FIG. 1A as viewed along line 1B-1B.

FIG. 1B shows a schematic sectional view of the conventional vehicle frame or chassis 7 as viewed along line 1B-1B of FIG. 1A. FIG. 1B shows left and right rockers, rocker panels or frame rails 37, 39 flanking the cabin area of the vehicle, where the rockers/frame rails 37, 39 are constructed as two separate box-like sections having an overall width $W_1$ as measured between their outermost surfaces 37', 39'. (The rockers/frame rails 37, 39 are the structural portions of the frame or chassis 7 on the left and right sides of the vehicle located between the two wheelwells.) In contrast, FIG. 2A shows a top view of an alternative vehicle frame or chassis 9, such as for an electric vehicle, and FIG. 2B shows a schematic sectional view of the electric vehicle frame 9 as viewed along line 2B-2B of FIG. 2A. In FIG. 2B, the electric vehicle frame 9 is constructed to have a larger, single box-like section 41 in the cabin area of the vehicle, with an overall width $W_2$ which may be about the same as or larger than the width $W_1$ of the conventional vehicle frame 7. This singular box-like structure 41 provides much better $I_C$ (bending moment of inertia) and J (polar moment of inertia) characteristics than the conventional use of two separate, smaller rockers 37, 39, thus providing improved resistance to bending and torsional deformation. This improved resistance is useful in mitigating the effects of external loads acting upon the vehicle 12, thus offering increased protection to the energy/power source stored in the UFES area under the floorboard of the vehicle 12.

Figure 3:
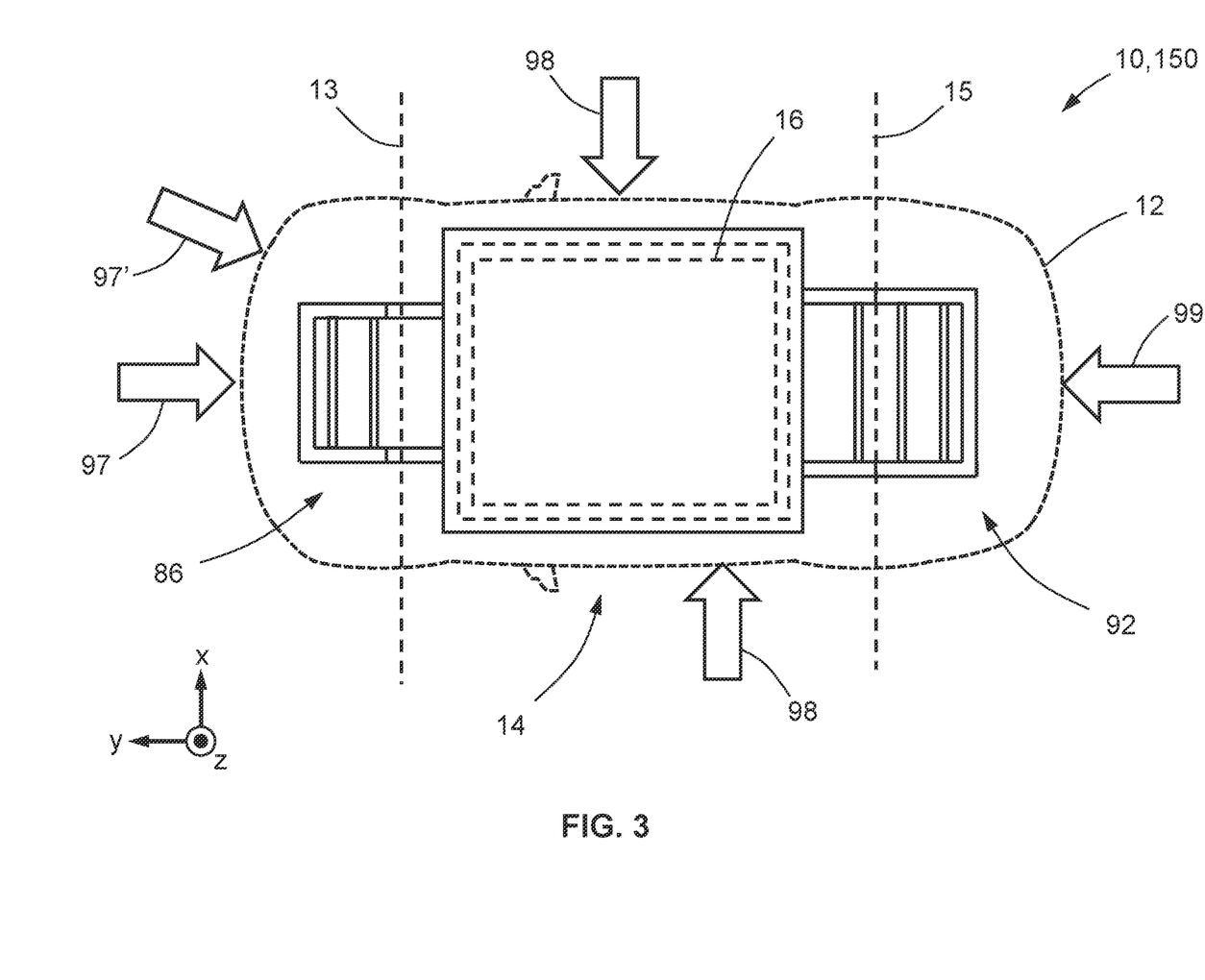
FIG. 3 is a top schematic view of an automotive vehicle assembly and body structure for an automotive vehicle, illustrating various external load events.
Figure 4:
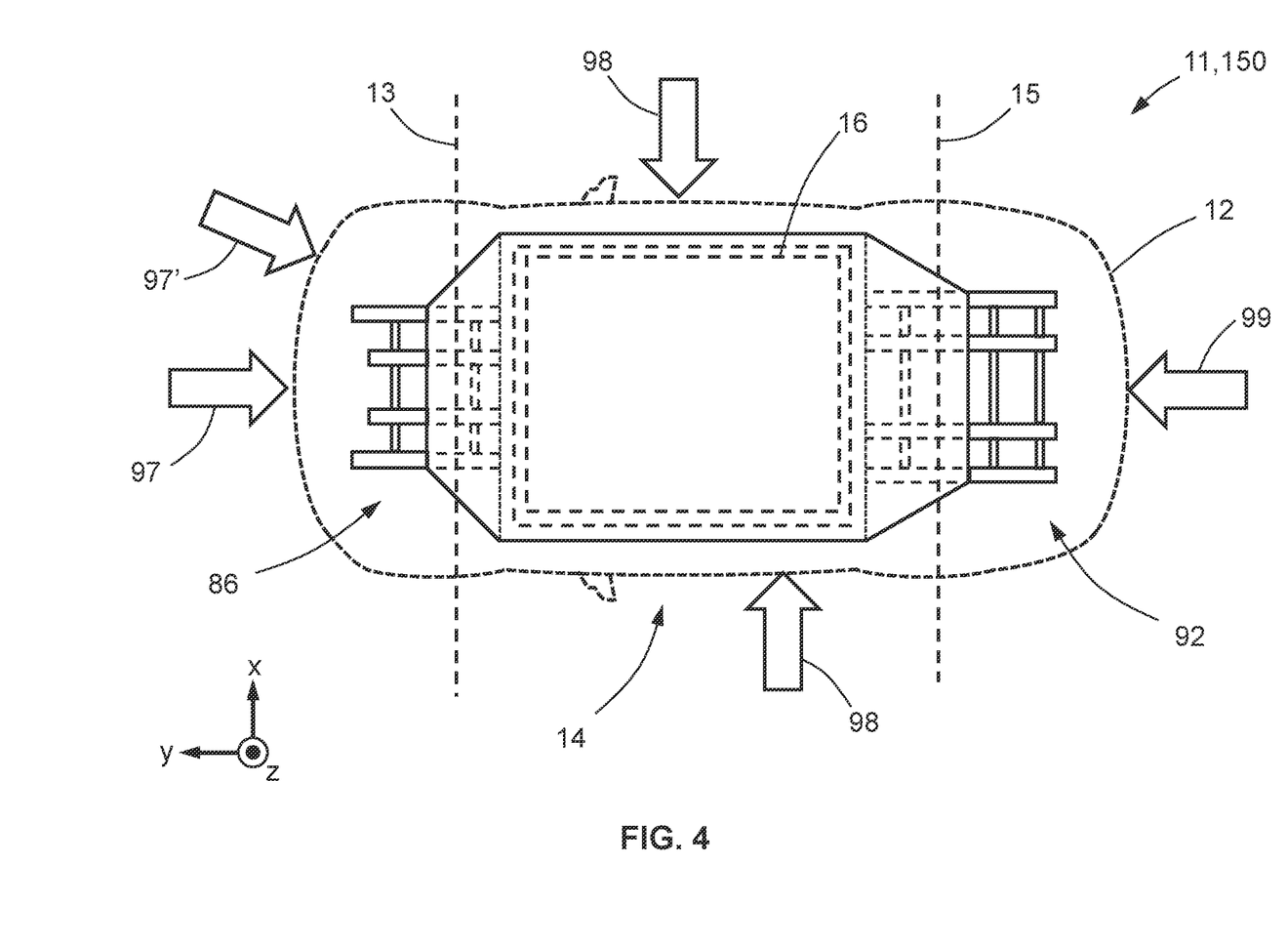
FIG. 4 is a top schematic view of another automotive vehicle assembly and body structure for an automotive vehicle, illustrating various external load events.

FIGS. 3-4 show top schematic views of body structures 10, 11 and automotive vehicle assemblies 150 for an automotive vehicle 12, illustrating various external load events, such as full frontal loads 97, off-center front loads 97', side loads 98 and rear loads 99. These external load events 97, 97', 98, 99 may occur from contact with foreign objects on the road surface (such as loose ball hitches, road debris, etc.), stationary objects (such as road signs, signal light/streetlight pylons, etc.), other vehicles, and so forth. As used herein, an "external" load means one that originates from, is caused by or is due to objects outside the vehicle. As explained further below, the body structures 10, 11 and automotive vehicle assemblies 150 described herein provide improvements and advantages over conventional approaches in their ability to distribute external load energy from load events 97, 97', 98, 99 and in providing torsional rigidity around an internal power source 16. The automotive vehicle frame 9 may have a "3-box" or "front-middle-rear box" type of construction, wherein the middle or main box is an enclosure 14 which may enclose the power source 16, the front box is a front box structure 86 through which the front axle 13 may pass and in which an internal combustion engine may be housed (e.g., for hybrid vehicles), and the rear box is a rear box structure 92 through which the rear axle 15 may pass and in which a trunk space may be formed.

Referring now to FIGS. 5-11, four different but related embodiments of body structures $10_T$, $10_S$, $11_T$, $11_S$ and automotive vehicle assemblies 150 according to the present description will be discussed. The first and second embodiments include body structures $10_T$, $10_S$ that have upper and lower shear structure assemblies 42, 54 (hereinafter "SSAs"), with each SSA 42, 54 having a generally quadrilateral overall shape (e.g., square, rectangular, trapezoidal, etc.). The third and fourth embodiments include body structures $11_T$, $11_S$ that also have upper and lower SSAs 42, 54, but with each panel 42, 54 having a generally quadrilateral main portion 53, 69, a generally trapezoidal front portion 70, 78, and a generally trapezoidal rear portion 72, 80. Thus the first and second embodiments do not have trapezoidal portions, while the third and fourth embodiments do have trapezoidal portions 70, 72, 78, 80. In each of the four embodiments, the upper SSA 42 may serve as the floor or floorboard of the vehicle's interior cabin, while the lower SSA 54 may serve as the underside surface of the vehicle 12 facing the road surface.

The embodiments also differ in terms of the relative "height" of their respective enclosures or main box structures 14 (and in relation to this height, also differing in how various elements are interconnected). For example, the first and third embodiments are referred to as "tall" body structures $10_T$, $11_T$, while the second and fourth embodiments are referred to as "short" body structures $10_S$, $11_S$. (Note that the subscripts "T" and "S" are used to designate "tall" and "short" embodiments, respectively. As used herein, reference numeral 10 may be used to refer to either or both of the $10_T$ and $10_S$ embodiments, and reference numeral 11 may be used to refer to either or both of the $11_T$ and $11_S$ embodiments). As explained further below, in some cases there may be a difference in the interconnectivity among various elements as between the "tall" and "short" body structures 11 in terms of how the trapezoidal sections 70, 72, 78, 80 attach to the front and rear box structures 86, 92. For the purpose of convenience and reference, these four embodiments and their respective features are summarized below in TABLE 1.

TABLE 1

Overview of Embodiments vs. Features

Figures 5A, 5B, 5C, 5D, 5E:
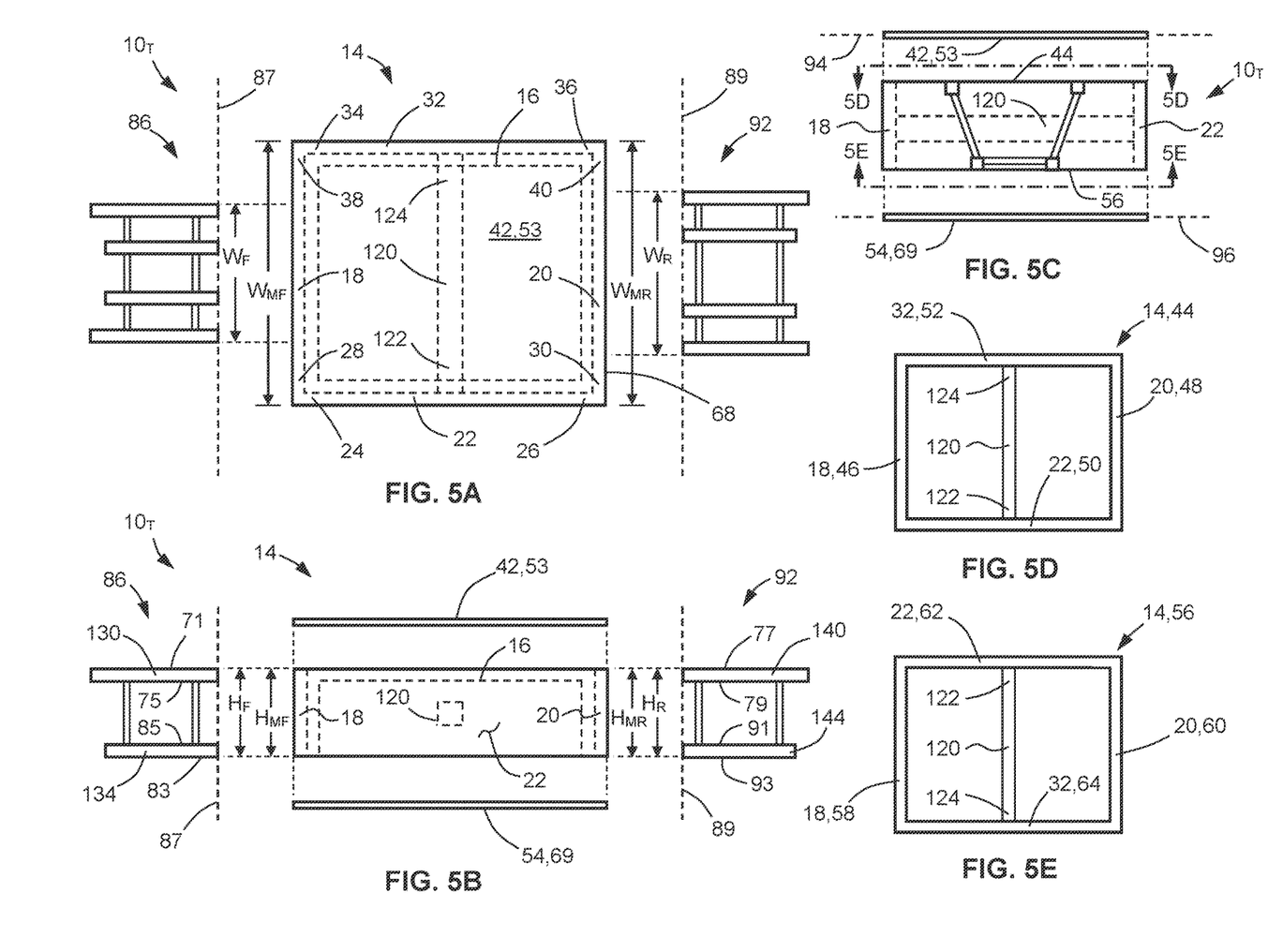
FIGS. 5A-C are exploded schematic top, side and front views, respectively, of a "tall" body structure in accordance with a first embodiment of the disclosure.
FIGS. 5D-E are schematic top and bottom views of the enclosure shown in FIG. 5C as viewed along lines 5D-5D and 5E-5E, respectively.
Figure 6A:
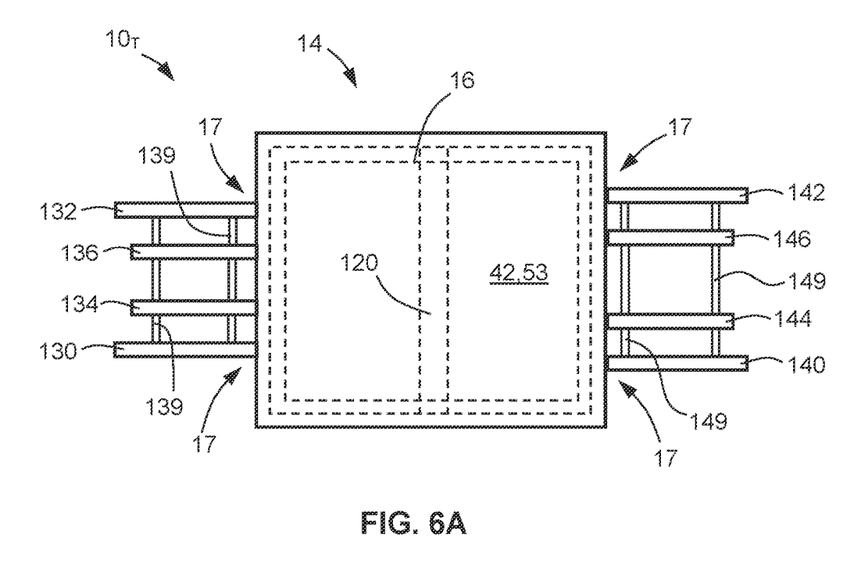
FIGS. 6A-C are assembled schematic top, side and front views, respectively, of the "tall" body structure shown in FIGS. 5A-C.
Figure 6B:
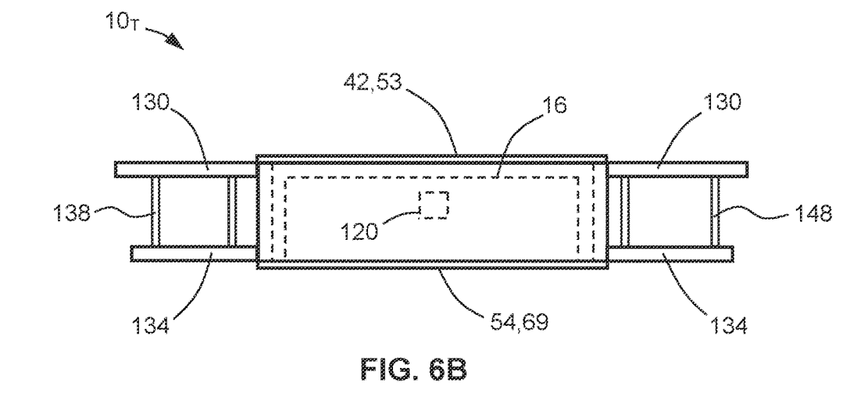
Figure 6C:
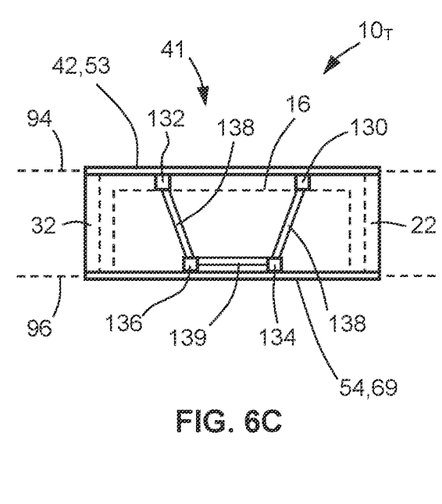
Figures 7A, 7B, 7C, 7D, 7E:
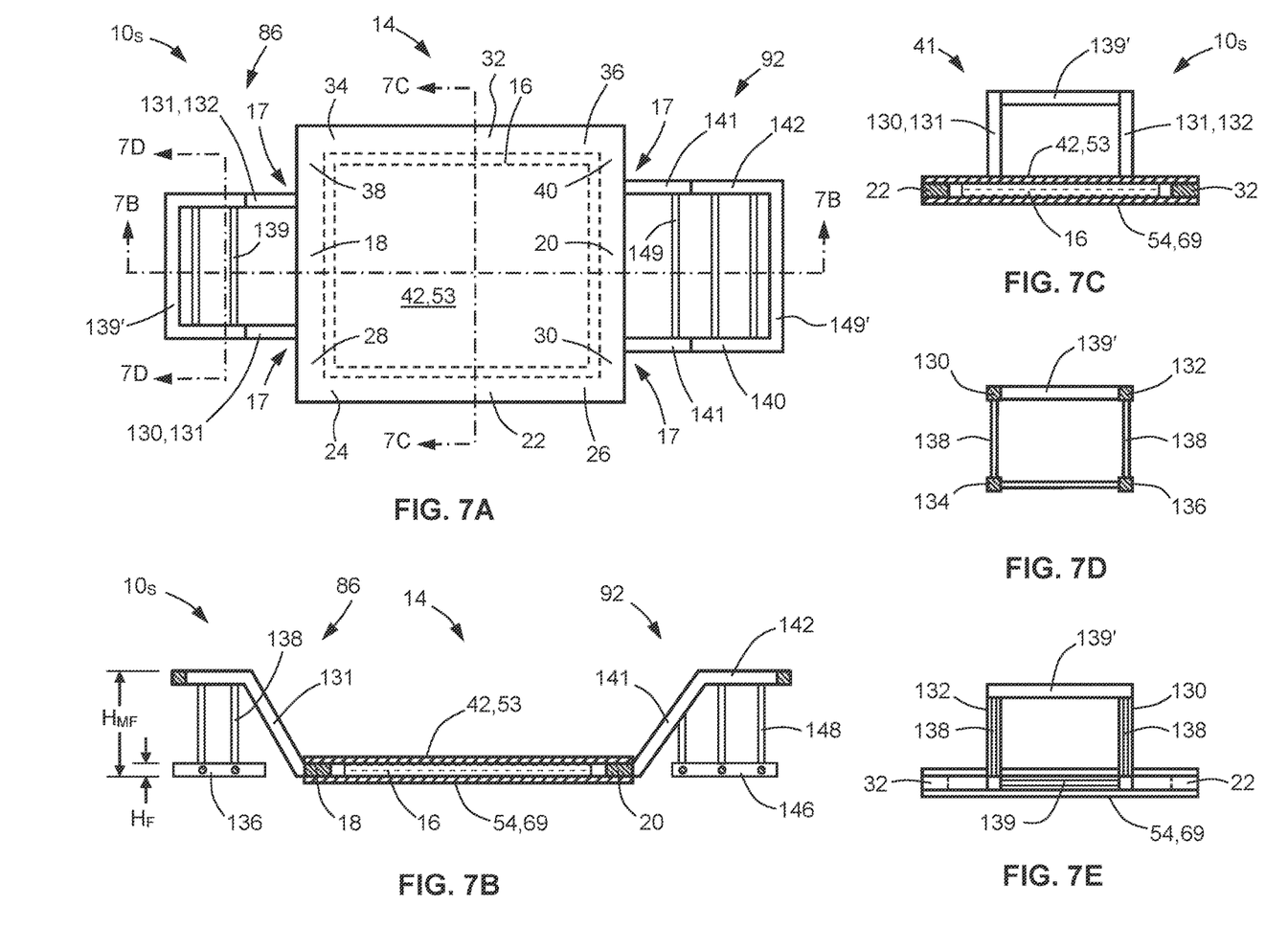
FIG. 7A is a schematic top view of a "short" body structure in accordance with a second embodiment of the disclosure.
FIGS. 7B-D are schematic sectional views of the "short" body structure of FIG. 7A as viewed along lines 7B-7B, 7C-7C and 7D-7D, respectively.
FIG. 7E is a schematic front view of the "short" body structure of FIG. 7A.
Figure 8A:
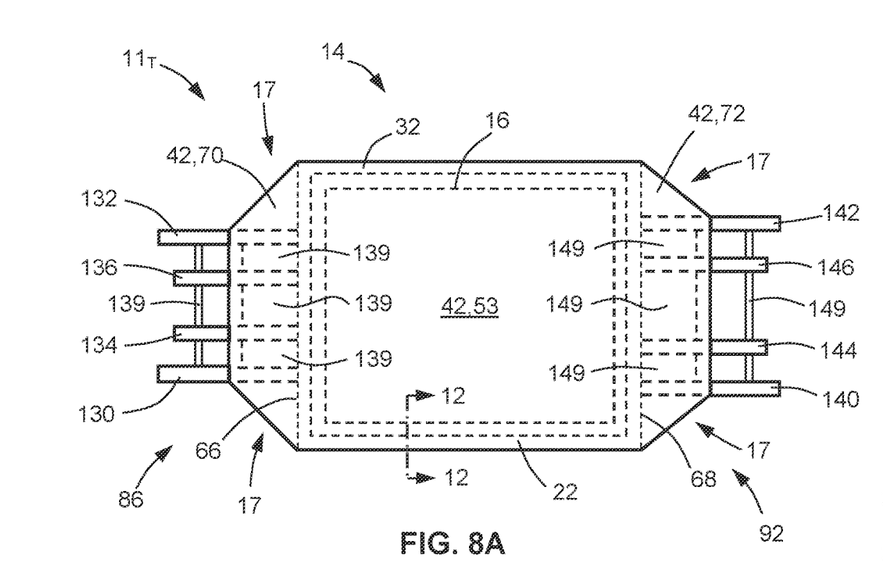
FIGS. 8A-C are schematic top, side and front views, respectively, of a "tall" body structure in accordance with a third embodiment of the disclosure.
Figure 8B:
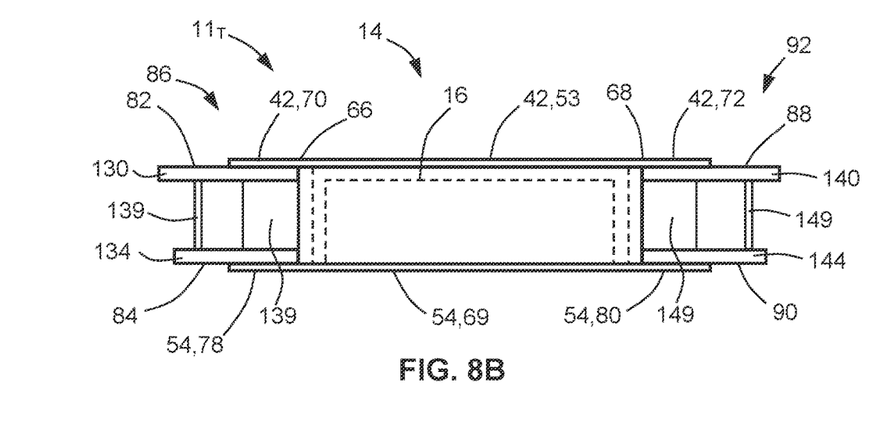
Figure 8C:
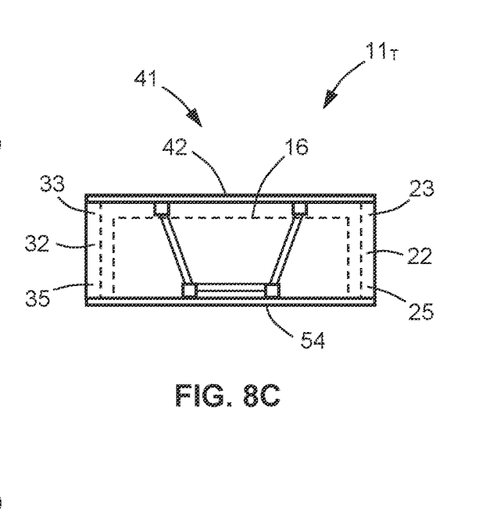
Figure 9A:
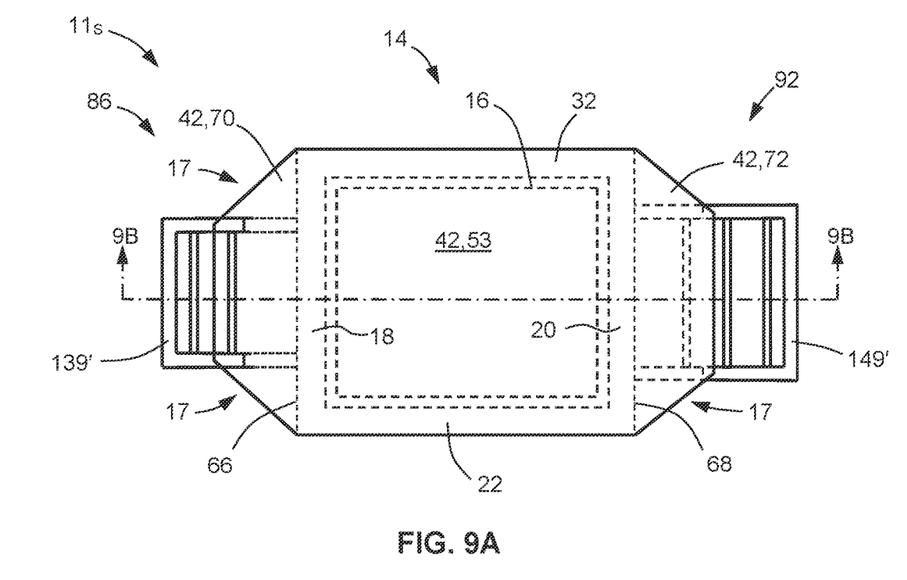
FIG. 9A is a schematic top view of a "short" body structure in accordance with a fourth embodiment of the disclosure.
Figure 9B:
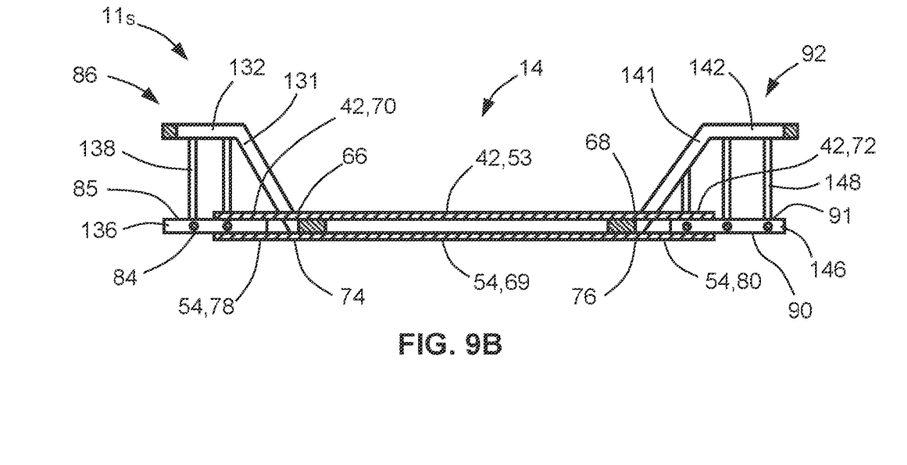
FIG. 9B is a schematic side view of the "short" body structure of FIG. 9A.

| Embodiment | Height of Enclosure | Body Structure | Trapezoidal Sections (70, 72, 78, 80) | Drawings |
|---|---|---|---|---|
| First | Tall | $10_T$ | No | FIGS. 5-6 |
| Second | Short | $10_S$ | No | FIG. 7 |
| Third | Tall | $11_T$ | Yes | FIG. 8 |
| Fourth | Short | $11_S$ | Yes | FIG. 9 |

FIGS. 5A-C show exploded schematic top, side and front views, and FIGS. 6A-C show assembled schematic top, side and front views, of a "tall" body structure $10_T$ in accordance with the first embodiment. The body structure $10_T$ is for an automotive vehicle 12 and includes an enclosure 14 for a power source 16, an upper SSA 42 and a lower SSA 54. The enclosure 14 includes a front cross-member 18, a rear cross-member 20 disposed generally parallel to and spaced apart the front cross-member 18, a left rocker 22 connected at opposed first and second ends 24, 26 thereof to respective left ends 28, 30 of the front and rear cross-members 18, 20, and a right rocker 32 connected at opposed third and fourth ends 34, 36 thereof to respective right ends 38, 40 of the front and rear cross-members 18, 20. As illustrated in the top views shown in FIGS. 5A and 6A, the enclosure 14 may be generally quadrilateral in shape (e.g., square, rectangular or trapezoidal), which generally matches the shape of the space available between the front and rear axles 13, 15 longitudinally and between the left and right sides of the vehicle laterally (as well as generally matching the typical shape of battery assemblies 16 which are also generally quadrilateral in shape). As shown in FIGS. 3-4, the enclosure 14 may be configured for positioning between front and rear axles 13, 15 of the automotive vehicle 12.

FIGS. 5D-E (as well as FIGS. 6B-C) show that the upper SSA 42 is disposed across a top 44 of the enclosure 14 and is fastened to respective top surfaces 46, 48, 50, 52 of the front and rear cross-members 18, 20 and the left and right rockers 22, 32. Similarly, the lower SSA 54 is disposed across a bottom 56 of the enclosure 14 and is fastened to respective bottom surfaces 58, 60, 62, 64 of the front and rear cross-members 18, 20 and the left and right rockers 22, 32. In this configuration of the body structure $10_T$, the upper SSA 42 forms a generally quadrilateral-shaped upper main portion 53 that generally matches the shape of the underlying top surfaces 46, 48, 50, 52 of the enclosure 14, and the lower SSA 54 forms a generally quadrilateral-shaped lower main portion 69 that generally matches the shape of the overhead bottom surfaces 58, 60, 62, 64 of the enclosure 14.

FIG. 7 shows various views of a "short" body structure $10_S$ in accordance with the second embodiment. Here, the enclosure 14 is much shorter in height than it is in the first "tall" embodiment of FIGS. 5-6. In the first embodiment, the height $H_{MF}$ of the front of the enclosure/main box structure 14 may be approximately the same as the height $H_F$ of the front box section 86, and the height $H_{MR}$ of the rear of the enclosure/main box structure 14 may be approximately the same as the height $H_R$ of the rear box section 92. As illustrated in FIG. 5B, for the first embodiment, the height $H_F$ of the front box structure 86 may be approximately equal to the distance from the bottom 83 of the lower front cradles 134, 136 to the top 71 of the upper front longitudinal rails 130, 132, and the height $H_R$ of the rear box structure 92 may be approximately equal to the distance from the bottom 93 of the lower rear cradles 144, 146 to the top 77 of the upper rear longitudinal rails 140, 142. However, for the second embodiment (see FIG. 7B), the front and rear heights $H_F$, $H_R$ of the enclosure/main box structure 14 may be much shorter than those for the first embodiment. Vehicle designers may select a "tall" body structure $10_T$ like the first embodiment, a "short" body structure $10_S$ like the second embodiment, or some variation between these sizes, to accommodate the desired design targets for a given vehicle. Considerations which may have bearing on the body structure selected may include the amount of vertical space available in the vehicle cabin, the amount of space needed for the power source 16, etc.

The front box structure 86 may include left and right upper longitudinal front rails 130, 132, left and right lower longitudinal front rails (also called front cradles) 134, 136, and a plurality of vertical front members 138 and transverse front members 139, 139' interconnecting the longitudinal front rails 130, 132, 134, 136. The rear box structure 92 may include left and right upper longitudinal rear rails 140, 142, left and right lower longitudinal rear rails (also called rear cradles) 144, 146, and a plurality of vertical rear members 148 and transverse rear members 149, 149' interconnecting the longitudinal rear rails 140, 142, 144, 146.

Note that the front and rear box structures 86, 92 may differ among various embodiments, depending on design constraints, design choices, etc. For example, FIGS. 5-6 show front and rear box structures 86, 92 where the front lower longitudinal rails/cradles 134, 136 are disposed laterally inboard of the front upper longitudinal rails 130, 132; similarly, the rear lower longitudinal rails/cradles 144, 146 are disposed laterally inboard of the rear upper longitudinal rails 140, 142. As seen in the front view of FIG. 6C, this configuration gives the front box structure 86 a generally trapezoidal appearance as viewed from the front. (And although not explicitly shown in the drawings, the rear box structure 92 would likewise have a generally trapezoidal appearance as viewed from the rear). In contrast, FIG. 7 shows front and rear box structures 86, 92 where the front lower longitudinal rails/cradles 134, 136 are disposed directly under the front upper longitudinal rails 130, 132, and the rear lower longitudinal rails/cradles 144, 146 are disposed directly under the rear upper longitudinal rails 140, 142; as seen in the front view of FIG. 7E, this configuration gives the front box structure 86 a generally rectangular appearance as viewed from the front (with the rear box structure 92 likewise having a generally rectangular appearance as viewed from the rear). Also note that in the first embodiment, all four of the front longitudinal rails 130, 132, 134, 136 may attach to the front cross-member 18 and all four of the rear longitudinal rails 140, 142, 144, 146 may attach to the rear cross-member 20; however, in the second embodiment, only the upper front longitudinal rails 130, 132 are attached to the front cross-member 18, and only the upper rear longitudinal rails 140, 142 are attached to the rear cross-member 20. In the second embodiment, each of the front upper longitudinal rails 130, 132 has a respective descending portion 131 which connects to the front cross-member 18, and each of the rear upper longitudinal rails 140, 142 has a respective ascending portion 141 which connects to the rear cross-member 20. Furthermore, note that in the second embodiment, the front box structure 86 has a frontmost transverse front member 139' attached to the forward ends of the upper front longitudinal rails 130, 132 and the rear box structure 92 has a rearmost transverse rear member 149' attached to the rearward ends of the upper rear longitudinal rails 140, 142; however, the these frontmost and rearmost members 139', 149' are not found in the front and rear box structures 86, 92 of the first embodiment. In addition to the embodiments and configurations shown in the drawings, the two types of front and rear box structures 86, 92 shown may be used with any embodiment. For example, the front and rear box structures 86, 92 shown in FIGS. 5-6 in the first embodiment may also be used in the second embodiment, and the front and rear box structures 86, 92 shown in FIG. 7 in the second embodiment may also be used in the first embodiment.

Note that the "3-box" construction of the automotive vehicle frame 9 may have abrupt transitions 17 (e.g., 90 degree angles) at the four outer corners where the longitudinal rails of the front and rear box structures 86, 92 meet the front and rear cross-members 18, 20. This abrupt transition is not ideal for transmitting and distributing external load energy when a load event occurs. Therefore, in order to help distribute such load energy, the first and second embodiments may be modified by adding generally trapezoidal sections to the front and rear edges of the upper and lower SSAs 42, 54, thereby giving rise to the third and fourth embodiments, respectively.

FIG. 8 shows various views of a "tall" body structure $11_T$ in accordance with the third embodiment. In this configuration, the upper SSA 42 may include a front upper edge 66 extending along and proximate to the front cross-member 18 and a rear upper edge 68 extending along and proximate to the rear cross-member 20, with the front and rear upper edges 66, 68 and the left and right sides of the upper SSA 42 defining a generally quadrilateral-shaped upper main portion 53 of the upper SSA 42. The upper SSA 42 further includes a generally trapezoidal front upper section 70 extending forward from the front upper edge 66 and a generally trapezoidal rear upper section 72 extending rearward from the rear upper edge. Likewise, the lower SSA 54 may include a front lower edge 74 extending along and proximate to the front cross-member 18 and a rear lower edge 76 extending along and proximate to the rear cross-member 20, with the front and rear lower edges 74, 76 and the left and right sides of the lower SSA 54 defining a generally quadrilateral-shaped lower main portion 69 of the lower SSA 54. The lower SSA 54 further includes a generally trapezoidal front lower section 78 extending forward from the front lower edge 74 and a generally trapezoidal rear lower section 80 extending rearward from the rear lower edge 76. The generally trapezoidal front upper and lower sections 70, 78 may be configured for attachment to a front box top portion 82 and a front box bottom portion 84, respectively, of the front box structure 86, and the generally trapezoidal rear upper and lower sections 72, 80 may be configured for attachment to a rear box top portion 88 and a rear box bottom portion 90, respectively, of the rear box structure 92. Here, the front box top portion 82 may be the front upper longitudinal rails 130, 132, the front box bottom portion 84 may be the front lower longitudinal rails/cradles 134, 136, the rear box top portion 88 may be the rear upper longitudinal rails 140, 142 and the rear box bottom portion 90 may be the rear lower longitudinal rails/cradles 144, 146. In this example, the generally trapezoidal sections 70, 72, 78, 80 may attach to the tops, bottoms or sides of the longitudinal rails. For instance, as illustrated in FIG. 8B, the front and rear upper trapezoidal sections 70, 72 may be configured to attach to the tops 71 of the front upper longitudinal rails 130, 132 and the tops 77 of the rear upper longitudinal rails 140, 142, respectively, and the front and rear lower trapezoidal sections 78, 80 may be configured to attach to the bottoms 83 of the front lower longitudinal rails 134, 136 and the bottoms 93 of the rear lower longitudinal rails 144, 146, respectively.

FIG. 9 shows various views of a "short" body structure $11_S$ in accordance with the fourth embodiment. This fourth embodiment is similar to the third embodiment in that both embodiments include the generally trapezoidal sections 70, 72, 78, 80. In this configuration, each of the generally trapezoidal front upper and lower sections 70, 78 may be configured for attachment to the front box bottom portion 84 of the front box structure 86, and each of the generally trapezoidal rear upper and lower sections 72, 80 may be configured for attachment to the rear box bottom portion 90 of the rear box structure 92. As with the third embodiment, in this fourth embodiment the front box bottom portion 84 may be the front lower longitudinal rails/cradles 134, 136, and the rear box bottom portion 90 may be the rear lower longitudinal rails/cradles 144, 146. In this arrangement, the generally trapezoidal sections 70, 72, 78, 80 may attach to the tops, bottoms or sides of the lower longitudinal rails/cradles 134, 136, 144, 146. For example, in the configuration shown in FIG. 9B, the generally trapezoidal upper sections 70, 72 are attached to the tops 85, 91 of the front box and rear box bottom portions 84, 90, and the generally trapezoidal lower sections 78, 80 are attached to the bottoms 83, 93 of the front box and rear box bottom portions 84, 90. Depending upon the configuration of front and rear box structures 86, 92 used—i.e., the arrangement of the vertical front and rear members 138, 148 and the use (or not) of descending and ascending portions 131, 141 of the upper longitudinal rails 130, 132, 140, 142—the front and rear upper trapezoidal sections 70, 72 may include holes or passageways through which the vertical members 138, 148 and the descending/ascending portions 131, 141 may pass.

Figure 10:
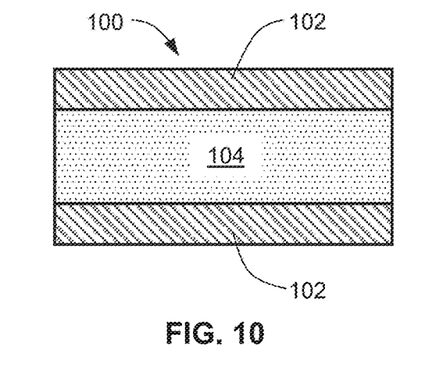
FIG. 10 is a schematic sectional view of a shear structure assembly having a metal foam sandwich structure in accordance with the disclosure.
Figure 11A:
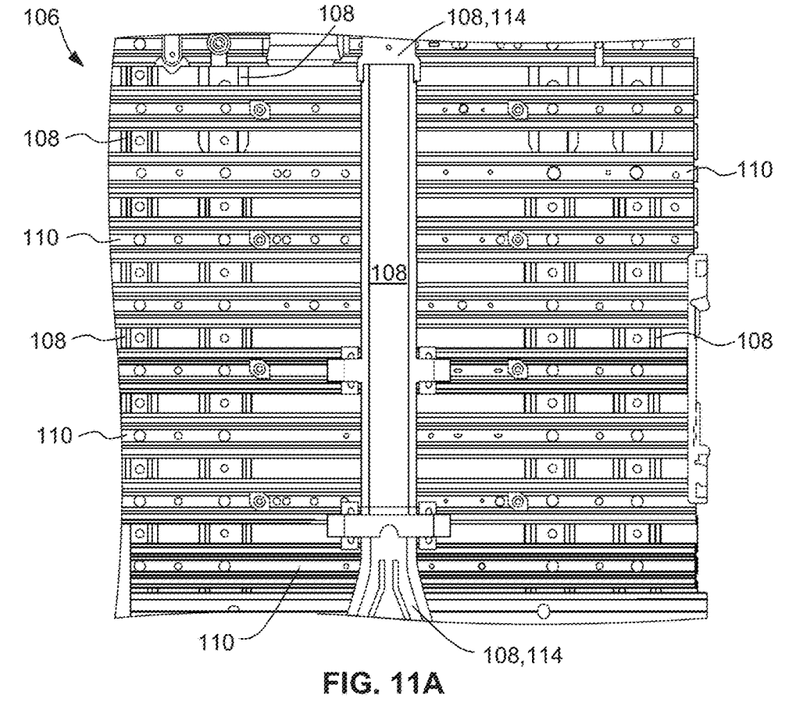
FIGS. 11A-B are schematic top and side views, respectively, of a shear structure assembly having a lattice structure in accordance with the disclosure.
Figure 11B:
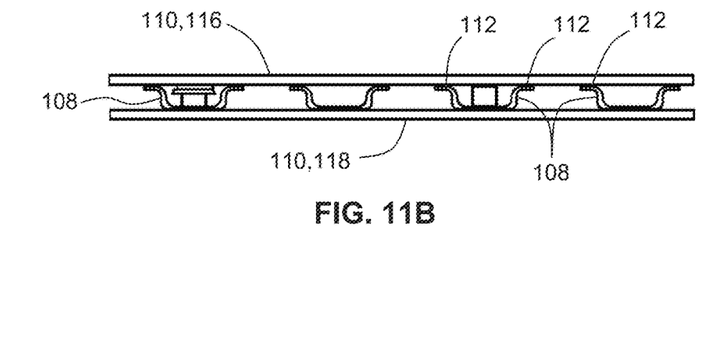

In order to provide the desired structural support for the distribution of loads, each of the upper and lower SSAs 42, 54 may be constructed as structurally supporting assembly of multiple layers, rather than as a single layer. This multi-layer construction helps to avoid potential buckling concerns with using a single layer. For example, one or both of the upper and lower SSAs 42, 54 may be constructed as a metallic foam sandwich 100 as illustrated in FIG. 10, in which an inner porous portion 104 is sandwiched or interposed between opposing upper and lower outer skins or layers 102 that are relatively solid. The metallic foam sandwich construction 100 may be made out of steel, aluminum, magnesium or other suitable metals. Alternatively, as illustrated in FIG. 11, one or both of the upper and lower SSAs 42, 54 may be constructed as a lattice 106 of interconnected longitudinal structural members 108 and transverse structural members 110. These structural members 108, 110 may be made of metal, carbon fiber, composite/reinforced materials (e.g., fiberglass) or the like, and may be fastened together using fasteners 112 (e.g., nuts/bolts, rivets, weldments, etc.). The lattice 106 may also include one or more shear plates 114 attached to the structural members 108, 110 in areas where additional reinforcement and/or stabilization is desired. The lattice 106 may further include an upper sheet layer 116 and/or a lower sheet layer 118 attached to the structural members 108, 110. For example, the upper SSA 42 may include an upper panel or sheet 116 plus a lattice 106 of structural members 108, while the lower SSA 54 may include both upper and lower panels or sheets 116, 118 plus a lattice of structural members 108 interposed between the panels or sheets 116, 118. Additionally, each SSA 42, 54 may be constructed of both metallic foam sandwich 100 portions and lattice 106 portions. In each of the four embodiments presented herein, each of the upper and lower SSAs 42, 54 may define a respective plane 94, 96 wherein each of the SSAs 42, 54 is effective to dissipate in-plane (i.e., within the planes 94 and 96 of the SSAs 42, 54) a portion of an external load 97, 97', 98, 99 imposed upon the enclosure 14, the front box structure 86 and/or the rear box structure 92. Furthermore, when the generally trapezoidal sections 70, 72, 78, 80 of the third and fourth embodiments are attached to the front and rear box structures 86, 92, this helps mitigate the effects of the abrupt transitions 17 and aids the SSAs 42, 54 in distributing external load energy when a load event occurs.

The body structure 10, 11 and automotive vehicle assembly 150 may further include at least one intermediate cross-member 120, wherein each intermediate cross-member 120 has a respective fifth end 122 attached to the left rocker 22 and a respective sixth end 124 attached to the right rocker 32. The body structure 10, 11 and automotive vehicle assembly 150 may further include the power source 16, wherein optionally one or more intermediate cross-members 120 may extend through the power source 16.

According to one embodiment, a body structure 11 for an automotive vehicle 12, wherein the automotive vehicle 12 defines front/forward and rear/rearward longitudinal (i.e., ±y) directions, left and right transverse (i.e., ±x) directions, and upward and downward vertical (i.e., ±z) directions, includes: (i) a quadrilateral-shaped main box structure 14 for a power source 16, the main box structure 14 including a transversely oriented front cross-member 18 having a main box front width $W_{MF}$, a rear cross-member 20 disposed generally parallel with and to the rear of the front cross-member 18 and having a main box rear width $W_{MR}$, a left rocker 22 connected at opposed first and second ends 24, 26 thereof to respective left ends 28, 30 of the front and rear cross-members 18, 20, and a right rocker 32 connected at opposed third and fourth ends 34, 36 thereof to respective right ends 38, 40 of the front and rear cross-members 18, 20; (ii) a front box structure 86 connected to the front cross-member 18 and having a front box width $W_F$ less than the main box front width $W_{MF}$; (iii) a rear box structure 92 connected to the rear cross-member 20 and having a rear box width $W_R$ less than the main box rear width $W_{MR}$; (iv) an upper SSA 42 having an upper main portion 53 disposed across a top 44 of the main box structure 14 and fastened to respective top surfaces 46, 48, 50, 52 of the front and rear cross-members 18, 20 and the left and right rockers 22, 32, a generally trapezoidal front upper section 70 extending forward from a front upper edge 66 of the upper main portion 53 and attached to the front box structure 86, and a generally trapezoidal rear upper section 72 extending rearward from a rear upper edge 68 of the upper main portion 53 and attached to the rear box structure 92; and (v) a lower SSA 54 having a lower main portion 69 disposed across a bottom 56 of the main box structure 14 and fastened to respective bottom surfaces 58, 60, 62, 64 of the front and rear cross-members 18, 20 and the left and right rockers 22, 32, a generally trapezoidal front lower section 78 extending forward from a front lower edge 74 of the lower main portion 69 and attached to the front box structure 86, and a generally trapezoidal rear lower section 80 extending rearward from a rear lower edge 76 of the lower main portion 69 and attached to the rear box structure 92.

According to another embodiment, an automotive vehicle assembly 150 includes: (i) a generally rectangular main box structure 14 comprising a transversely oriented front cross-member 18 having a main box front width $W_{MF}$, a rear cross-member 20 disposed generally parallel with and to the rear of the front cross-member 18 and having a main box rear width $W_{MR}$, a left rocker 22 connected at opposed first and second ends 24, 26 thereof to respective left ends 28, 30 of the front and rear cross-members 18, 20, and a right rocker 32 connected at opposed third and fourth ends 34, 36 thereof to respective right ends 38, 40 of the front and rear cross-members 18, 20; (ii) a front box structure 86 connected to the front cross-member 18 and having a front box width $W_F$ that is narrower than the main box front width $W_{MF}$; (iii) a rear box structure 92 connected to the rear cross-member 20 and having a rear box width $W_R$ that is narrower than the main box rear width $W_{MR}$; (iv) an upper SSA 42 having an upper main portion 53 disposed across a top 44 of the main box structure 14 and fastened to respective top surfaces 46, 48, 50, 52 of the front and rear cross-members 18, 20 and the left and right rockers 22, 32, a generally trapezoidal front upper section 70 extending forward from the upper main portion 53 and attached to the front box structure 86, and a generally trapezoidal rear upper section 72 extending rearward from the upper main portion 53 and attached to the rear box structure 92; (v) a lower SSA 54 having a lower main portion 69 disposed across a bottom 56 of the main box structure 14 and fastened to respective bottom surfaces 58, 60, 62, 64 of the front and rear cross-members 18, 20 and the left and right rockers 22, 32, a generally trapezoidal front lower section 78 extending forward from the lower main portion 69 and attached to the front box structure 86, and a generally trapezoidal rear lower section 80 extending rearward from the lower main portion 69 and attached to the rear box structure 92; and (vi) a power source 16 disposed within the main box structure 14 and between the upper and lower SSAs 42, 54.

Figure 12:
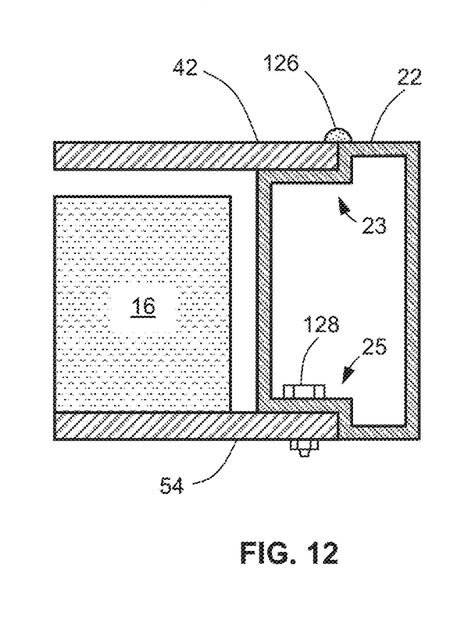
FIG. 12 is a schematic partial side view of the body structure of FIG. 8A as viewed along line 12-12.

FIG. 12 shows a schematic partial side view of the body structure 11 of FIG. 8A as viewed along line 12-12. The lower SSA 54 may be removably fastened via removable fasteners 128 (e.g., nuts and bolts) to respective lower portions 25, 35 of the left and right rockers 22, 32. This allows the lower SSA 54 to be removed so that the power source 16 may be installed, serviced and/or removed from underneath the automotive vehicle 12. The upper SSA 42 may be attached to respective upper portions 23, 33 of the left and right rockers 22, 32, either removably (such as by using nuts and bolts) or permanently/semi-permanently (such as by using weldments 126, flow drill screws, self-piercing rivets, adhesives, etc.) Each of the upper and lower SSAs 42, 54 may define a respective plane 94, 96 wherein each of the SSAs 42, 54 is effective to dissipate in-plane a portion of an external load 97, 97', 98, 99 imposed upon the enclosure 14, the front box structure 86 and/or the rear box structure 92.

Note that the descriptions presented herein of the body structure 10, 11 may also apply to the automotive vehicle assembly 150 as well, and vice versa. Furthermore, the various lengths, widths and heights described herein may refer to average lengths, widths and heights. Moreover, the names of some elements may be presented in varying (and sometimes truncated) word order in certain places in the present disclosure in order to emphasize particular aspects of the element, and yet may refer to the same element. For example, the element represented by reference numeral 130 may be referred to as a "left upper longitudinal front rail", an "upper longitudinal front rail", a "front upper longitudinal rail", an "upper front longitudinal rail", etc. Each of the planes 94, 96 defined by the upper and lower SSAs 42, 54 may be a flat plane, or may be an undulating plane (e.g., not entirely flat, such as having some sections that are flat and other sections that are curved, with folds or transitions between such sections), but in any event each plane 94, 96 follows the contour, shape and/or profile of its respective upper or lower SSA 42, 54. Additionally, some or all of the front vertical and transverse members 138, 139 may be replaced or supplemented with walls interconnecting the front longitudinal members 130, 132, 134, 136, and some or all of the rear vertical and transverse members 148, 149 may be replaced or supplemented with walls interconnecting the rear longitudinal members 140, 142, 144, 146. Furthermore, while the rockers 22, 32 in the second and fourth "short" embodiments may be shorter in height than the rockers 22, 32 in the first and third "tall" embodiments, the front and rear cross-members 18, 20 (or some portions thereof) in the second and fourth "short" embodiments may have heights $H_{MF}$, $H_{MR}$ that are the same as or comparable to the heights of the front and rear cross-members 18, 20 in the first and third "tall" embodiments (such as the same heights as the front and rear box structures $H_F$, $H_R$).

The above description is intended to be illustrative, and not restrictive. While various specific embodiments have been presented, those skilled in the art will recognize that the disclosure can be practiced with various modifications within the spirit and scope of the claims. While the dimensions and types of materials described herein are intended to be illustrative, they are by no means limiting and are exemplary embodiments. Moreover, in the following claims, use of terms such as "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "generally" are used herein to modify an adjective, such as in the phrase "generally trapezoidal", these adverbs mean "for the most part", "to a significant extent" and/or "to a large degree", and do not necessarily mean "perfectly", "completely", "strictly" or "entirely". For example, a "generally trapezoidal" shape can include a perfect trapezoid as well as an undulatory shape that has an overall trapezoidal shape whose perimeter may include sides or edges that are not perfectly straight, corners that are not perfectly angular (e.g., rounded) and/or deviations inward and/or outward from the overall trapezoidal shape. Additionally, the word "proximate" may be used herein to describe the location of an object or feature with respect to another object or feature, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A body structure for an automotive vehicle, comprising:
   an enclosure for a power source, the enclosure comprising a front cross-member, a rear cross-member disposed generally parallel to and spaced apart the front cross-member, a left rocker connected at opposed first and second ends thereof to respective left ends of the front and rear cross-members, and a right rocker connected at opposed third and fourth ends thereof to respective right ends of the front and rear cross-members;
   an upper shear structure assembly disposed across a top of the enclosure and fastened to respective top surfaces of the front and rear cross-members and the left and right rockers, wherein the upper shear structure assembly includes a front upper edge extending along the front cross-member, a rear upper edge extending along the rear cross-member, a generally trapezoidal front upper section extending from the front upper edge and a generally trapezoidal rear upper section extending from the rear upper edge; and
   a lower shear structure assembly disposed across a bottom of the enclosure and fastened to respective bottom surfaces of the front and rear cross-members and the left and right rockers, wherein the lower shear structure assembly includes a front lower edge extending along the front cross-member, a rear lower edge extending along the rear cross-member, a generally trapezoidal front lower section extending from the front lower edge and a generally trapezoidal rear lower section extending from the rear lower edge.

2. A body structure according to claim 1, wherein the generally trapezoidal front upper and lower sections are configured for attachment to a front box top portion and a front box bottom portion, respectively, of a front box structure, and the generally trapezoidal rear upper and lower sections are configured for attachment to a rear box top portion and a rear box bottom portion, respectively, of a rear box structure.

3. A body structure according to claim 1, wherein each of the upper and lower shear structure assemblies defines a respective plane and wherein each of the shear structure assemblies is effective to dissipate in-plane a portion of an external load imposed upon the enclosure.

4. A body structure according to claim 1, wherein at least one of the upper and lower shear structure assemblies is constructed as at least one of a metallic foam sandwich and a lattice of interconnected structural members.

5. A body structure according to claim 1, wherein each of the generally trapezoidal front upper and lower sections is configured for attachment to a front box bottom portion of a front box structure, and each of the generally trapezoidal rear upper and lower sections is configured for attachment to a rear box bottom portion of a rear box structure.

6. A body structure according to claim 1, further comprising at least one intermediate cross-member, wherein each intermediate cross-member has a respective fifth end attached to the left rocker and a respective sixth end attached to the right rocker.

7. A body structure according to claim 6, further comprising the power source, and wherein each of the at least one intermediate cross-member extends through the power source.

8. A body structure according to claim 1, wherein the enclosure is configured for positioning between front and rear axles of the automotive vehicle.

9. A body structure according to claim 1, wherein the enclosure is generally rectangular or generally trapezoidal.

10. A body structure for an automotive vehicle, the automotive vehicle defining front and rear longitudinal directions, left and right transverse directions, and upward and downward vertical directions, comprising:
   a quadrilateral-shaped main box structure for a power source, the main box structure comprising a transversely oriented front cross-member having a main box front width $W_{MF}$, a rear cross-member disposed generally parallel with and to the rear of the front cross-member and having a main box rear width $W_{MR}$, a left rocker connected at opposed first and second ends thereof to respective left ends of the front and rear cross-members, and a right rocker connected at opposed third and fourth ends thereof to respective right ends of the front and rear cross-members;
   a front box structure connected to the front cross-member and having a front box width $W_F$ less than the main box front width $W_{MF}$;
   a rear box structure connected to the rear cross-member and having a rear box width $W_R$ less than the main box rear width $W_{MR}$;
   an upper shear structure assembly having an upper main portion disposed across a top of the main box structure and fastened to respective top surfaces of the front and rear cross-members and the left and right rockers, a generally trapezoidal front upper section extending forward from a front upper edge of the upper main portion and attached to the front box structure, and a generally trapezoidal rear upper section extending rearward from a rear upper edge of the upper main portion and attached to the rear box structure; and
   a lower shear structure assembly having a lower main portion disposed across a bottom of the main box structure and fastened to respective bottom surfaces of the front and rear cross-members and the left and right rockers, a generally trapezoidal front lower section extending forward from a front lower edge of the lower main portion and attached to the front box structure, and a generally trapezoidal rear lower section extending rearward from a rear lower edge of the lower main portion and attached to the rear box structure.

11. A body structure according to claim 10, wherein each of the upper and lower shear structure assemblies defines a respective plane and wherein each of the shear structure assemblies is effective to dissipate in-plane a portion of an external load imposed upon the main box structure, the front box structure and/or the rear box structure.

12. A body structure according to claim 10, wherein at least one of the upper and lower shear structure assemblies is constructed as at least one of a metallic foam sandwich and a lattice of interconnected structural members.

13. A body structure according to claim 10, wherein the front box structure comprises left and right upper longitudinal front rails, left and right lower longitudinal front rails, and a plurality of vertical and transverse front members interconnecting the longitudinal front rails, and wherein the rear box structure comprises left and right upper longitudinal rear rails, left and right lower longitudinal rear rails, and a plurality of vertical and transverse rear members interconnecting the longitudinal rear rails.

14. A body structure according to claim 10, further comprising at least one intermediate cross-member, wherein each intermediate cross-member has a respective fifth end attached to the left rocker and a respective sixth end attached to the right rocker.

15. An automotive vehicle assembly, comprising:
   a generally rectangular main box structure comprising a transversely oriented front cross-member having a main box front width $W_{MF}$, a rear cross-member disposed generally parallel with and to the rear of the front cross-member and having a main box rear width $W_{MR}$, a left rocker connected at opposed first and second ends thereof to respective left ends of the front and rear cross-members, and a right rocker connected at opposed third and fourth ends thereof to respective right ends of the front and rear cross-members;
   a front box structure connected to the front cross-member and having a front box width $W_F$ narrower than the main box front width $W_{MF}$;
   a rear box structure connected to the rear cross-member and having a rear box width $W_R$ narrower than the main box rear width $W_{MR}$;
   an upper shear structure assembly having an upper main portion disposed across a top of the main box structure and fastened to respective top surfaces of the front and rear cross-members and the left and right rockers, a generally trapezoidal front upper section extending forward from the upper main portion and attached to the front box structure, and a generally trapezoidal rear upper section extending rearward from the upper main portion and attached to the rear box structure;
   a lower shear structure assembly having a lower main portion disposed across a bottom of the main box structure and fastened to respective bottom surfaces of the front and rear cross-members and the left and right rockers, a generally trapezoidal front lower section extending forward from the lower main portion and attached to the front box structure, and a generally trapezoidal rear lower section extending rearward from the lower main portion and attached to the rear box structure; and
   a power source disposed within the main box structure and between the upper and lower shear structure assemblies.

16. An automotive vehicle assembly according to claim 15, wherein the lower shear structure assembly is removably fastened to respective lower portions of the left and right rockers.

17. An automotive vehicle assembly according to claim 15, wherein each of the upper and lower shear structure assemblies defines a respective plane and wherein each of the shear structure assemblies is effective to dissipate in-plane a portion of an external load imposed upon the main box structure, the front box structure and/or the rear box structure.

18. An automotive vehicle assembly according to claim 15, wherein at least one of the upper and lower shear structure assemblies is constructed as at least one of a metallic foam sandwich and a lattice of interconnected structural members.

19. An automotive vehicle assembly according to claim 15, further comprising at least one intermediate cross-member, wherein each intermediate cross-member has a respective fifth end attached to the left rocker and a respective sixth end attached to the right rocker.

\* \* \* \* \*